United States Patent
Kuo et al.

(10) Patent No.: US 11,036,429 B2
(45) Date of Patent: Jun. 15, 2021

(54) MEMORY CONTROL METHOD, MEMORY STORAGE DEVICE AND MEMORY CONTROL CIRCUIT UNIT TO DETERMINE A SOURCE BLOCK USING INTERLEAVING INFORMATION

(71) Applicant: PHISON ELECTRONICS CORP., Miaoli (TW)

(72) Inventors: Che-Yueh Kuo, New Taipei (TW); Wei-Jeng Wang, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 57 days.

(21) Appl. No.: 16/431,672

(22) Filed: Jun. 4, 2019

(65) Prior Publication Data
US 2020/0319822 A1 Oct. 8, 2020

(30) Foreign Application Priority Data
Apr. 2, 2019 (TW) ................. 108111597

(51) Int. Cl.
*G06F 3/06* (2006.01)
*G06F 12/06* (2006.01)

(52) U.S. Cl.
CPC .......... *G06F 3/0659* (2013.01); *G06F 3/0604* (2013.01); *G06F 3/0652* (2013.01); *G06F 3/0679* (2013.01); *G06F 12/0607* (2013.01); *G06F 2212/1044* (2013.01)

(58) Field of Classification Search
CPC ........ G06F 2212/72–7211; G06F 3/061–0613; G06F 3/064; G06F 3/0644; G06F 3/0654; G06F 12/0246; G06F 12/0253
See application file for complete search history.

(56) References Cited

U.S. PATENT DOCUMENTS

| | | | | |
|---|---|---|---|---|
| 8,572,311 B1* | 10/2013 | Shalvi | ................. | G06F 11/1016 711/103 |
| 2011/0231624 A1* | 9/2011 | Fukutomi | ........... | G06F 12/0246 711/162 |
| 2015/0347026 A1* | 12/2015 | Thomas | .............. | G06F 12/0246 711/103 |
| 2020/0097401 A1* | 3/2020 | Lee | ..................... | G06F 12/0253 |

OTHER PUBLICATIONS

Cai, Yu, et al. "Error characterization, mitigation, and recovery in flash-memory-based solid-state drives." Proceedings of the IEEE 105.9 (Aug. 18, 2017): 1666-1704. (Year: 2017).*

* cited by examiner

*Primary Examiner* — Charles Rones
*Assistant Examiner* — Hewy H Li
(74) *Attorney, Agent, or Firm* — JCIPRNET

(57) ABSTRACT

A memory control method for a rewritable non-volatile memory module is provided according to an exemplary embodiment of the disclosure. The memory control method includes: determining a first management unit as a source block and reading valid data from a first continuous data unit in the first management unit according to first interleaving information and second interleaving information, wherein the first interleaving information reflects a total number of the first continuous data units in the first management unit, and the second interleaving information reflects a total number of second continuous data units in a second management unit; storing the valid data into a recycling block; and erasing the first management unit.

18 Claims, 12 Drawing Sheets

| Management unit | Interleaving information |
|---|---|
| 81(1) | I(1) |
| 81(2) | I(2) |
| ⋮ | ⋮ |
| 81(n) | I(n) |

| Management unit | Valid count information |
|---|---|
| 81(1) | C(1) |
| 81(2) | C(2) |
| ⋮ | ⋮ |
| 81(n) | C(n) |

MEMORY CONTROL METHOD, MEMORY STORAGE DEVICE AND MEMORY CONTROL CIRCUIT UNIT TO DETERMINE A SOURCE BLOCK USING INTERLEAVING INFORMATION

CROSS-REFERENCE TO RELATED APPLICATION

This application claims the priority benefit of Taiwan application serial no. 108111597, filed on Apr. 2, 2019. The entirety of the above-mentioned patent application is hereby incorporated by reference herein and made a part of this specification.

BACKGROUND

Technical Field

The disclosure relates to a memory control technique, and more particularly, to a memory control method, a memory storage device and a memory control circuit unit.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

However, with increases in usage time and/or usage rate of the memory storage device, the number of spare physical units in the memory storage device will gradually decrease. When the number of the spare physical units is less than a preset number, the memory storage device starts to execute a garbage collection procedure. In general, the garbage collection procedure may choose which physical blocks to collect valid data from based on valid counts of different physical blocks. However, if a distribution of the valid data in the selected physical blocks is uneven, a read time for the valid data may be extended and a performance of the garbage collection procedure may be reduced.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure provides a memory control method, a memory storage device and a memory control circuit unit, which are capable of improving a system performance of the memory storage device.

An exemplary embodiment of the disclosure provides a memory control method for a rewritable non-volatile memory module. The rewritable non-volatile memory module includes a plurality of management units. The management units include a first management unit and a second management unit. The memory control method includes: determining the first management unit as a source block and reading valid data from a first continuous data unit in the first management unit according to first interleaving information and second interleaving information, wherein the first interleaving information reflects a total number of the first continuous data units in the first management unit, and the second interleaving information reflects a total number of second continuous data units in a second management unit; storing the valid data to a recycling block in the management units; and erasing the first management unit.

An exemplary embodiment of the disclosure further provides a memory storage device, which includes a connection interface unit, a rewritable non-volatile memory module and a memory control circuit unit. The connection interface unit is configured to couple to a host system. The rewritable non-volatile memory module includes a plurality of management units. The management units include a first management unit and a second management unit. The memory control circuit unit is coupled to the connection interface unit and the rewritable non-volatile memory module. The memory control circuit unit is configured to determine the first management unit as a source block and send at least one read command sequence as an instruction for reading valid data from a first continuous data unit in the first management unit according to first interleaving information and second interleaving information. The first interleaving information reflects a total number of the first continuous data units in the first management unit, and the second interleaving information reflects a total number of second continuous data units in a second management unit. The memory control circuit unit is further configured to send at least one first write command sequence as an instruction for storing the valid data into a recycling block in the management units, and the memory control circuit unit is further configured to send an erase command sequence as an instruction for erasing the first management unit.

An exemplary embodiment of the disclosure further provides a memory control circuit unit, which is configured to control a rewritable non-volatile memory module. The rewritable non-volatile memory module includes a plurality of management units. The management units include a first management unit and a second management unit. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is further configured to determine the first management unit as a source block and send at least one read command sequence as an instruction for reading valid data from a first continuous data unit in the first management unit according to first interleaving information and second interleaving information. The first interleaving information reflects a total number of the first continuous data units in the first management unit. The second interleaving information reflects a total number of second continuous data units in the second management unit. The memory management circuit is further configured to send at least one first write command sequence as an instruction for storing the valid data into a recycling block in the management units. The memory management circuit is further configured to send an erase command sequence as an instruction for erasing the first management unit.

An exemplary embodiment of the disclosure further provides a memory control method for a rewritable non-volatile memory module. The rewritable non-volatile memory module includes a plurality of management units. The memory control method includes: selecting at least one source block from the management units according to valid count information, interleaving information and dispersion information, wherein the valid count information reflects a data quantity of valid data stored by each management unit in the management units, the interleaving information reflects a total number of continuous data units included by at least one management unit in the management units, and the dispersion information reflects a degree of dispersion of the continuous data units in a plurality of physical units of the at least one management unit; collecting the valid data from the at least one source block; and storing the valid data into at least one recycling block in the management units.

Based on the above, the first interleaving information can reflect the total number of the first continuous data units in the first management unit of the management units, and the second interleaving information can reflect the total number of the second continuous data units in the second management unit of the management units. According to the first interleaving information and the second interleaving information, the first management unit may be automatically determined as the source block. Then, the valid data may be read from the first continuous data units and stored into the recycling block, and the first management unit may be erased. As a result, an access efficiency of the valid data in the source block can be effectively improved, thereby improving the system performance of the memory storage device.

To make the above features and advantages of the disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 10 is a schematic diagram illustrating interleaving information according to an exemplary embodiment of the disclosure.

FIG. 11 is a schematic diagram illustrating valid count information according to an exemplary embodiment of the disclosure.

DESCRIPTION OF THE EMBODIMENTS

Figure 1:
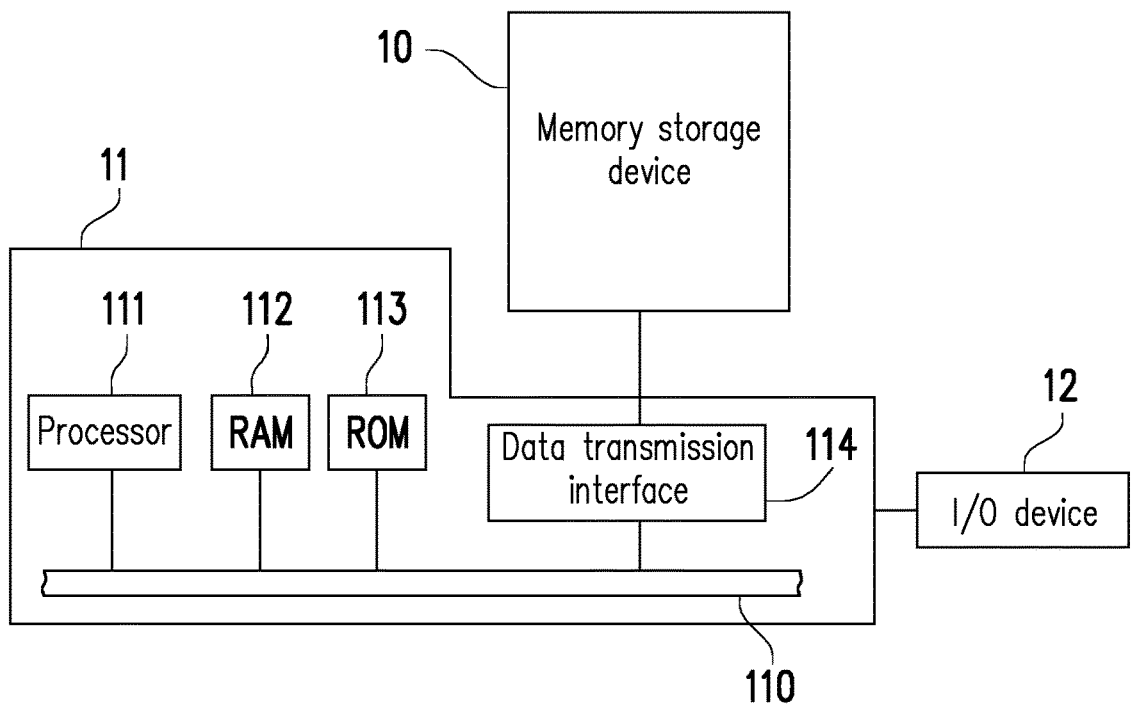
FIG. 1 is a schematic diagram illustrating a host system, a memory storage device and an I/O (input/output) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
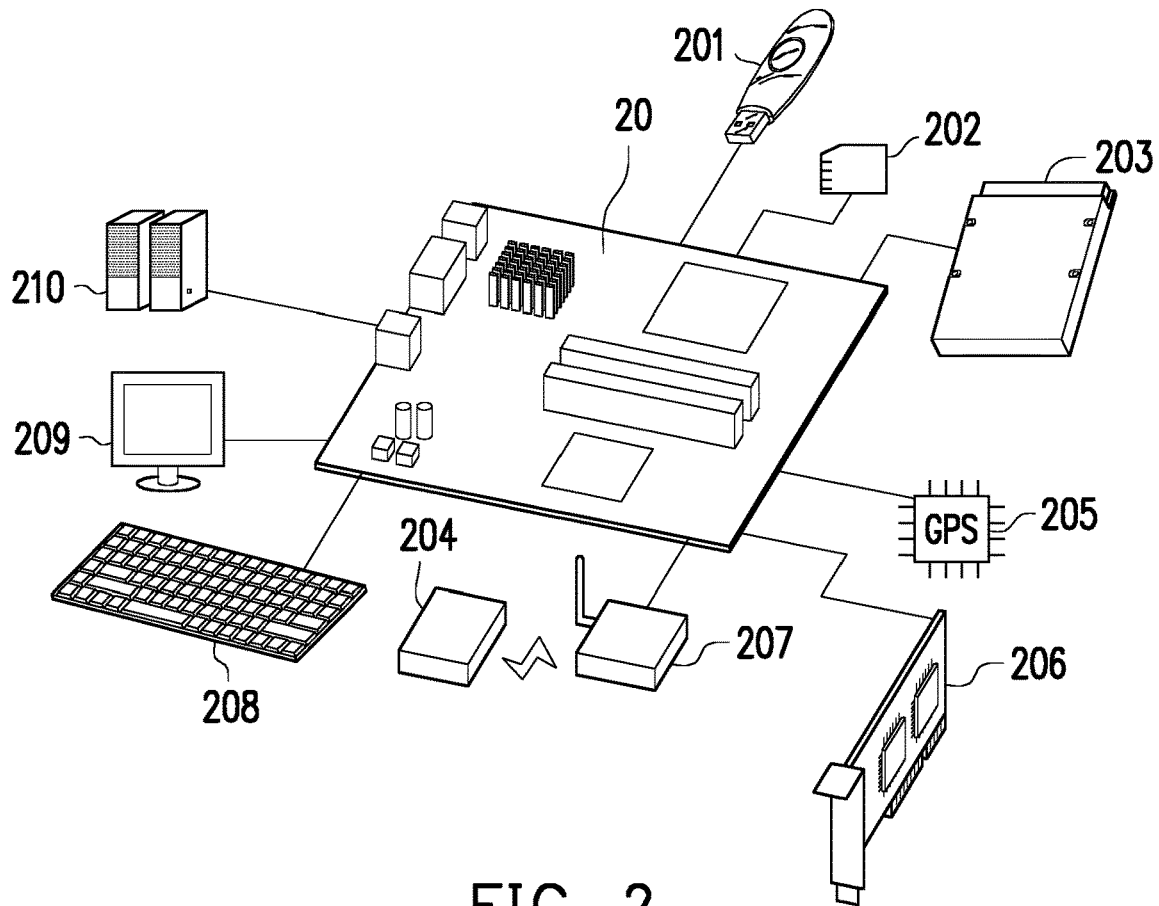
FIG. 2 is a schematic diagram illustrating a host system, a memory storage device and an I/O device according to another exemplary embodiment of the disclosure.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O device according to another exemplary embodiment of the disclosure. Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In this exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 510 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
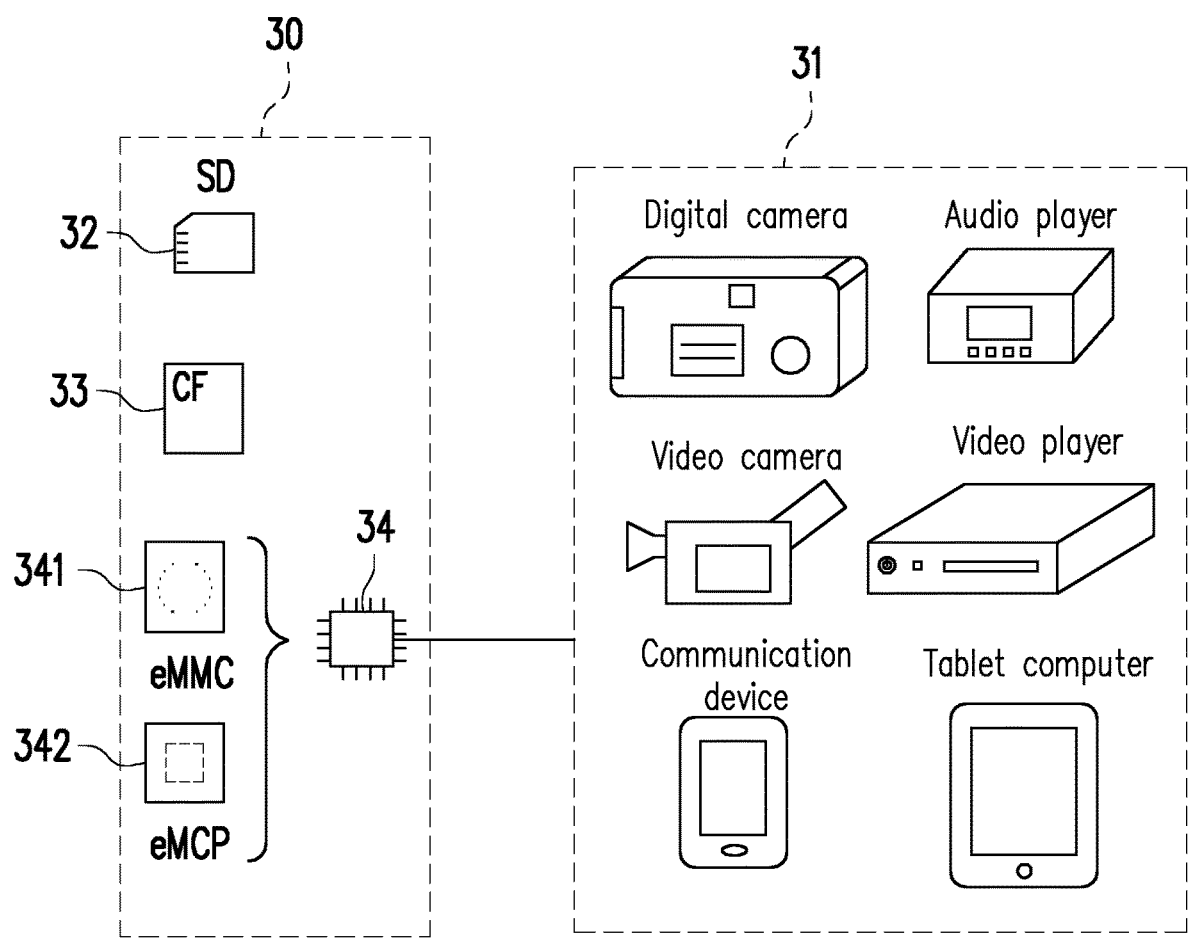
FIG. 3 is a schematic diagram illustrating a host system and a memory storage device according to another exemplary embodiment of the disclosure.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 31, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
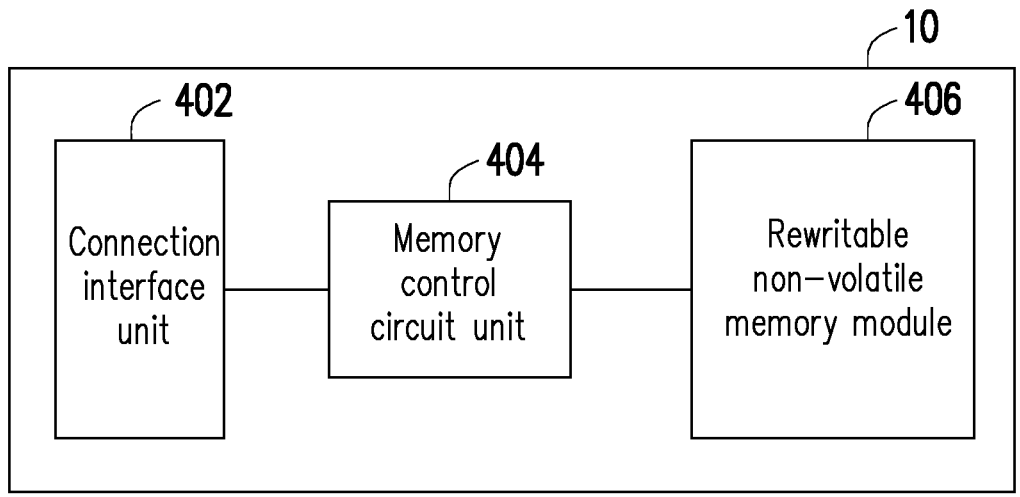
FIG. 4 is a schematic block diagram illustrating a memory storage device according to an exemplary embodiment of the disclosure.

FIG. 4 is a schematic block diagram illustrating a memory storage device according to an exemplary embodiment of the disclosure. Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. The memory storage device 10 can communicate with the host system 11 through the connection interface unit 402. In this exemplary embodiment, the connection interface unit 402 is compatible with a SATA (Serial Advanced Technology Attachment) standard. Nevertheless, it should be understood that the disclosure is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a Quad Level Cell (MLC) NAND-type flash memory module (i.e., a flash memory module capable of storing four bits in one memory cell), other flash memory modules or other memory modules having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". By changing the threshold voltage, each of the memory cells in the rewritable non-volatile memory module 406 can have a plurality of storage states. The storage state to which the memory cell belongs may be determined by applying a read voltage to the memory cell, so as to obtain the one or more bits stored in the memory cell.

In this exemplary embodiment, the memory cells of the rewritable non-volatile memory module 406 can constitute a plurality of physical programming units, and the physical programming units can constitute a plurality of physical erasing units. Specifically, the memory cells on the same word line can constitute one or more of the physical programming units. If each of the memory cells can store two or more bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit may be a physical page or a physical sector. If the physical programming unit is the physical page, these physical programming units can include a data bit area and a redundancy bit area. The data bit area contains multiple physical sectors configured to store user data, and the redundant bit area is configured to store system data (e.g., management data such as an error correcting code, etc.). In this exemplary embodiment, the data bit area contains 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
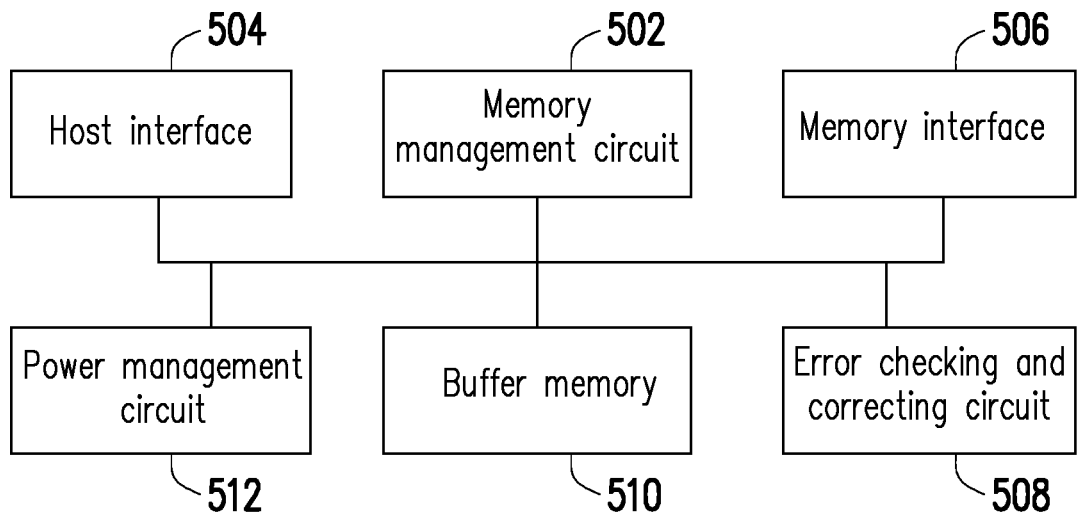
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure. Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 502 may also be stored as program codes in a specific area (for example, a system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of a memory cell group of the rewritable non-volatile memory module 406. The memory writing circuit is configured to send a write command sequence to the rewritable non-volatile memory module 406 so as to write data into the rewritable non-volatile memory module 406. The memory reading circuit is configured to send a read command sequence to the rewritable non-volatile memory module 406 so as to read data from the rewritable non-volatile memory module 406. The memory erasing circuit is configured to send an erase command sequence to the rewritable non-volatile memory module 406 so as to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes and instruct the rewritable non-volatile memory module 406 to execute the corresponding operations, such as writing, reading and erasing. In an exemplary embodiment, the memory management circuit 502 may further send command sequences of other types to instruct the rewritable non-volatile memory module 406 to execute the corresponding operations.

The host interface 504 is coupled to the memory management circuit 502. The memory management circuit 502 can communicate with the host system 11 through the host interface 504. The host interface 504 may be used to receive and identify commands and data transmitted by the host system 11. For example, the commands and the data transmitted by the host system 11 may be transmitted to the memory management circuit 502 via the host interface 504. In addition, the memory management circuit 502 can transmit data to the host system 11 via the host interface 504. In this exemplary embodiment, the host interface 504 is compatible with the SATA standard. Nevertheless, it should be understood that the disclosure is not limited in this regard. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 502 and transmitted to the rewritable non-volatile memory module 406 through the memory interface 506, for example. The command sequences may include one or more signals, or data transmitted in the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure the correctness of data. Specifically, when the memory management circuit 502 receives the writing command from the host system 11, the error checking and correcting circuit 508 generates an error correcting code (ECC) or an error detecting code (EDC) for data corresponding to the writing command, and the memory management circuit 502 writes data and the ECC or the EDC corresponding to the writing command to the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

In an exemplary embodiment, the rewritable non-volatile memory module 406 of FIG. 4 is also known as a flash memory module. The memory control circuit unit 404 is also known as a flash memory controller for controlling the flash memory module, and/or the memory management circuit 502 of FIG. 5 is also known as a flash memory management circuit.

Figure 6:
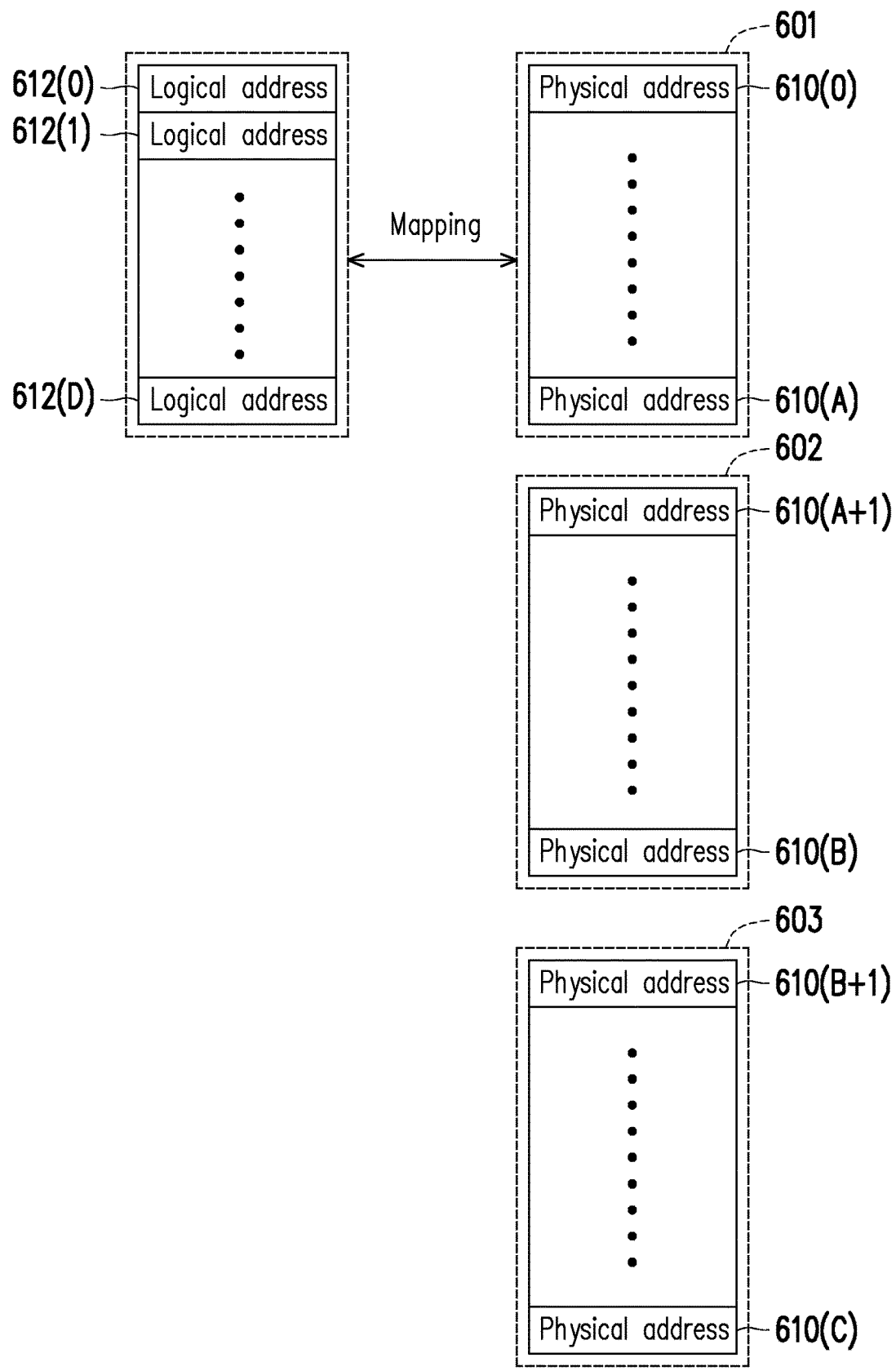
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure.

With reference to FIG. 6, the memory management circuit 502 can logically group physical addresses 610(0) to 610(C) of the rewritable non-volatile memory module 406 into a storage area 601, a spare area 602 and a system area 603. The physical addresses 610(0) to 610(A) in the storage area 601 are stored with data. For example, the physical addresses 610(0) to 610(A) in the storage area 601 can be stored with valid data and invalid data. The physical addresses 610(A+1) to 610(B) in the spare area 602 are not stored with data (e.g., the valid data). The physical addresses 610(B+1) to 610(C) in the storage area 603 are configured to store system data, such as a logical-to-physical mapping table, a bad block management table, a device model or management data of other types.

When the data is to be stored, the memory management circuit 502 selects one physical address from the physical addresses 610(A+1) to 610(B) in the spare area 602 and stores data from the host system 11 or at least one physical address in the storage area 601 into the selected physical address. Meanwhile, the selected physical address is then associated with the storage area 601. In addition, after one physical address in the storage area 601 is erased, that erased physical address is then re-associated with the spare area 602.

The memory management circuit 502 assigns logical addresses 612(0) to 612(D) for mapping to the physical addresses 610(0) to 610(A) in the storage area 601. Each of the logical addresses 612(0) to 612(D) may also be mapped to one or more physical addresses. It should be noted that, it is possible that the memory management circuit 502 does not assign logical addresses for mapping to the system area 603, so as to prevent the system data stored in the system area 603 from being changed by users.

The memory management circuit 502 records a mapping relation (also known as logical-to-physical mapping information) between the logical addresses and the physical addresses into at least one logical-to-physical mapping table. The logical-to-physical mapping table is stored in the physical addresses 610(B+1) to 610(C) in the system area 603. When the host system 11 intends to read data from the memory storage device 10 or write data into the memory storage device 10, the memory management circuit 502 can execute a data accessing operation on the memory storage device 10 according to the logical-to-physical mapping table.

The memory management circuit 502 manages and accesses the physical addresses in the rewritable non-volatile memory module 406 based on a management unit. One management unit is also known as a virtual block (VB). One management unit may contain a plurality of physical addresses. One physical address is composed of a plurality of memory cells. For example, one management unit may cover the physical addresses belonging to a plurality of planes (a.k.a. memory planes) and/or a plurality of chip enables (CE) in the rewritable non-volatile memory module 406. Further, one management unit may be associated with the storage area 601, the spare area 602 or the system area 603. The management unit belonging to the spare area 602 is also known as a spare block. The management unit belonging to the storage area 601 is also known as a non-spare block.

It should be noted that, the valid data is the latest data belonging to one specific logical address, and the invalid data is the latest data not belonging to any logical address. For example, if the host system 11 stores new data into one specific logical address to overwrite old data originally stored in that specific logical address (i.e., update the data of that specific logical unit), this new data stored in the storage area 601 is the latest data belonging to that logical address and marked as valid, whereas the old data being overwritten may still be stored in the storage area 601 but marked as invalid.

In this exemplary embodiment, if data belonging to one logical address is updated, a mapping relation between that logical address and the physical address stored with the old data belonging to that logical address is removed, and a mapping relation between that logical address and the physical address stored with the latest data belonging to that logical address is established. However, in another exemplary embodiment, if data belonging to one specific logical address is updated, a mapping relation between that specific logical address and the physical address stored with the old data belonging to that logical address may still be maintained.

When the memory storage device 10 leaves the factory, a total number of the management units belonging to the spare area 602 is a predetermined number (e.g., 30). During operation of the memory storage device 10, there will be increasingly more management units being selected from the spare area 602 and associated with the storage area 601 for storing data (e.g., the user data from the host system 11). Accordingly, the total number of the management units belonging to the spare area 602 will gradually decrease with use of the memory storage device 10 over time.

During operation of the memory storage device 10, the memory management circuit 502 continuously updates the total number of the management units belonging to the spare area 602. The memory management circuit 502 executes at least one data merging operation according to the number of the management units in the spare area 602 (i.e., a total number of the spare blocks). For example, the memory management circuit 502 may determine whether the total number of the management units belonging to the spare area 602 is less than or equal to a threshold (a.k.a. a first threshold). The first threshold may be, for example, 2 or a greater value (e.g., 10), which is not particularly limited by the disclosure. If the total number of the management units belonging to the spare area 602 is less than or equal to the first threshold, the memory management circuit 502 may execute the data merging operation. In an exemplary embodiment, the data merging operation is also known as a garbage collection operation.

In the data merging operation, the memory management circuit 502 can select at least one management unit from the storage area 601 as a source block (a.k.a. a source unit) and select at least one management unit from the spare area 602 as a recycling block (a.k.a. a recycling unit). The memory management circuit 502 can send at least one command sequence to instruct the rewritable non-volatile memory module 406 to copy the valid data from the management unit served as the source block to the management units served as the recycling block. The management unit served as the recycling block and fully written with the valid data is associated with the storage area 601. After all the valid data stored by one specific management unit are copied into the recycling unit, that specific management unit may be erased and associated with the spare area 602. In an exemplary embodiment, an operation of re-associating one specific management unit from the storage area 601 back to the spare area 602 (or an operation of erasing one management unit) is also known as releasing one spare block. By performing the data merging operation, one or more spare management units will be released so the total number of the management units belonging to the spare area 602 can gradually increase.

After the data merging operation is started, if the management units belonging to the spare area 602 match a specific condition, the data merging operation is then stopped. For example, the memory management circuit 502 may determine whether the total number of the management units belonging to the spare area 602 is greater than or equal to one threshold (also referred to as a second threshold hereinafter). For example, the second threshold may be greater than or equal to the first threshold. If the total number of the management units belonging to the spare area 602 is greater than or equal to the second threshold, the memory management circuit 502 may stop the data merging operation. It should be noted that, stopping the data merging operation refers to ending the data merging operation currently in process. After one data merging operation is stopped, if the total number of the management units belonging to the spare area 602 is less than or equal to the first threshold again, the next data merging operation may be executed again to try to release the new management units.

It is noted that in the following description, some terms may be replaced with corresponding abbreviations for ease of reading (see Table 1).

TABLE 1

| | |
|---|---|
| rewritable non-volatile memory module | RNVM module |
| memory management circuit | MMC |
| data merging operation | DMO |
| logical address | LA |
| physical address | PA |
| chip enable group | CEG |
| management unit | MU |
| continuous data unit | CDU |

Figure 7:
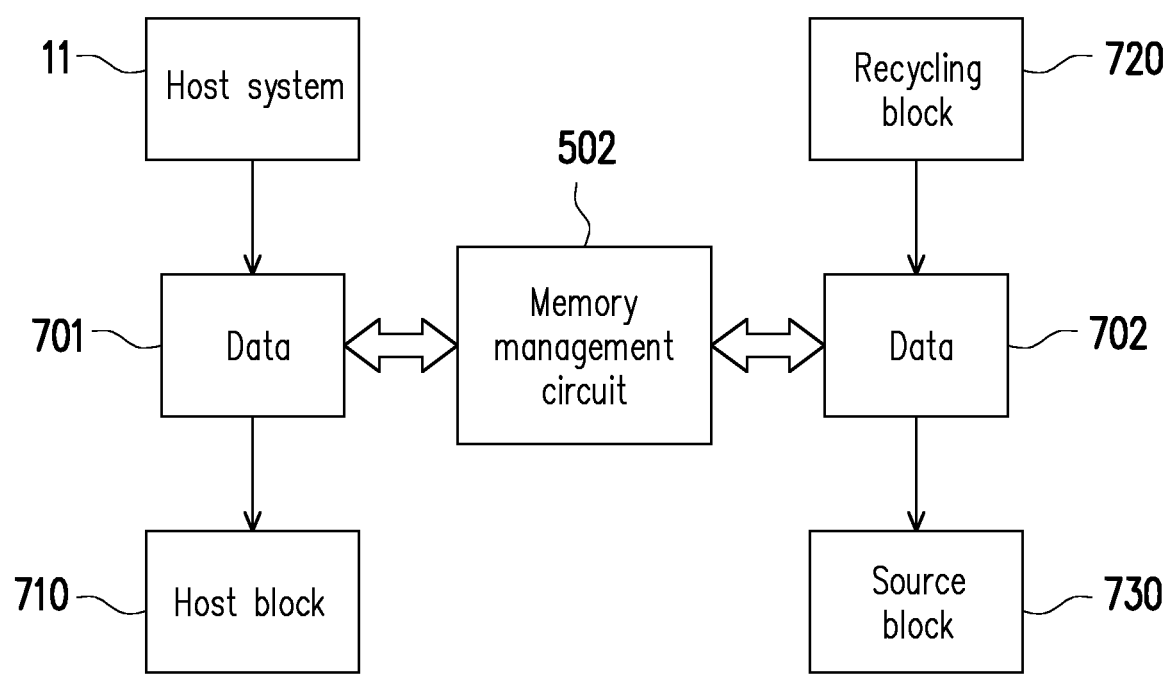
FIG. 7 is a schematic diagram illustrating a host writing operation and a data merging operation according to an exemplary embodiment of the disclosure.

FIG. 7 is a schematic diagram illustrating a host writing operation and a DMO according to an exemplary embodiment of the disclosure. With reference to FIG. 7, in the host writing operation, the host system 11 sends at least one write command as an instruction for writing data 701 into at least one LA. According to the write command, the MMC 502 can give the instruction for storing the data 701 into a host block 710 mapped to the LA. For example, the host block 710 may contain one specific MU selected from the spare area 602 of FIG. 6.

On the other hand, the MMC 502 may start one DMO to release the new spare block. In the DMO, data 702 may be collected from at least one MU served as a source block 720 and written into at least one management block served as a recycling block 730. The data 702 includes the valid data. If all the valid data stored by one specific MU served as the source block 720 are copied into the recycling block 730, that specific MU may be erased to become the new spare block.

Figure 8A:
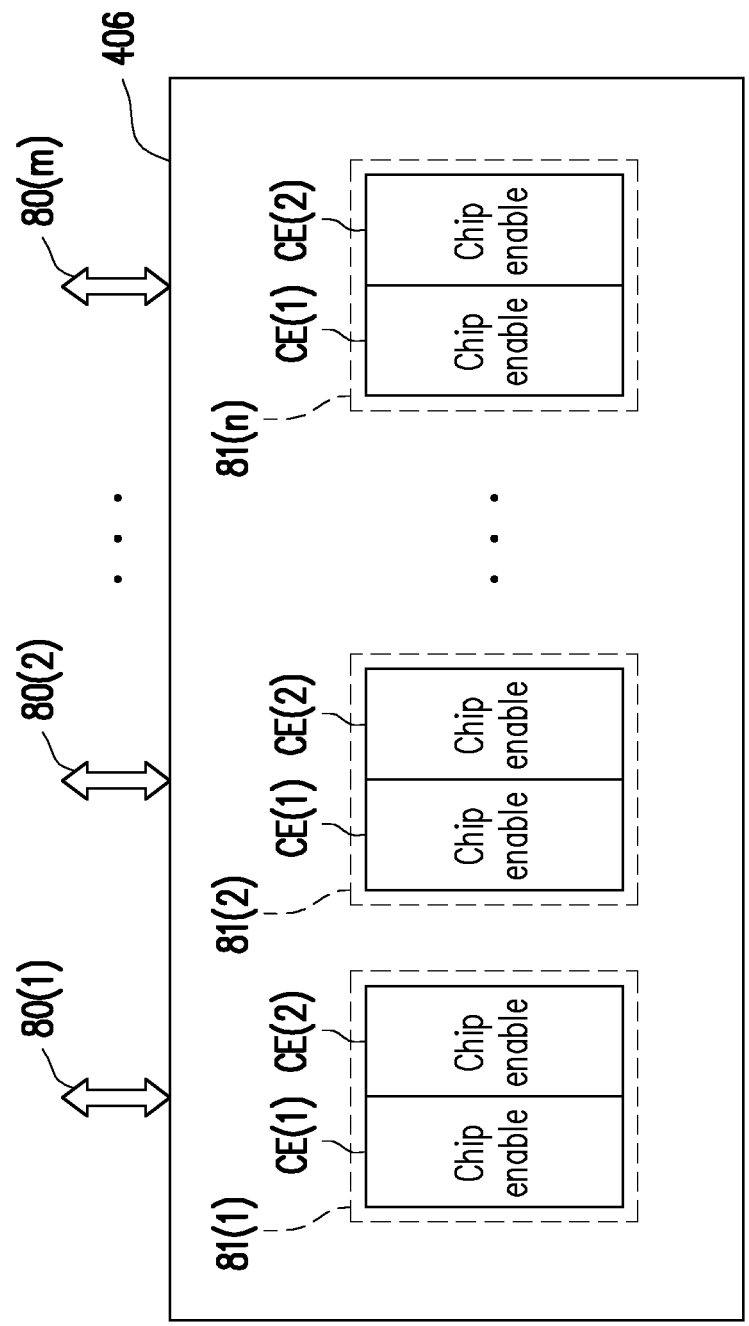
FIG. 8A is a schematic diagram illustrating management of a rewritable non-volatile memory module according to an exemplary embodiment of the disclosure.

FIG. 8A is a schematic diagram illustrating management of a RNVM module according to an exemplary embodiment of the disclosure. Referring to FIG. 8A, the RNVM module 406 includes MUs 81(1) to 81(n). Each of the MUs 81(1) to 81(n) contains chip enables (a.k.a. CEGs) CE(1) and CE(2). Each of the CEGs CE(1) and CE(2) contains a plurality of PAs. The MMC 502 can access the MUs 81(1) to 81(n) through channels 80(1) to 80(m). For example, the MMC 502 can access the chip enables CE(1) and CE(2) in the MU 81(1) in parallel (or interleave) through at least two channels of channels 80(1) to 80(m).

Figure 8B:
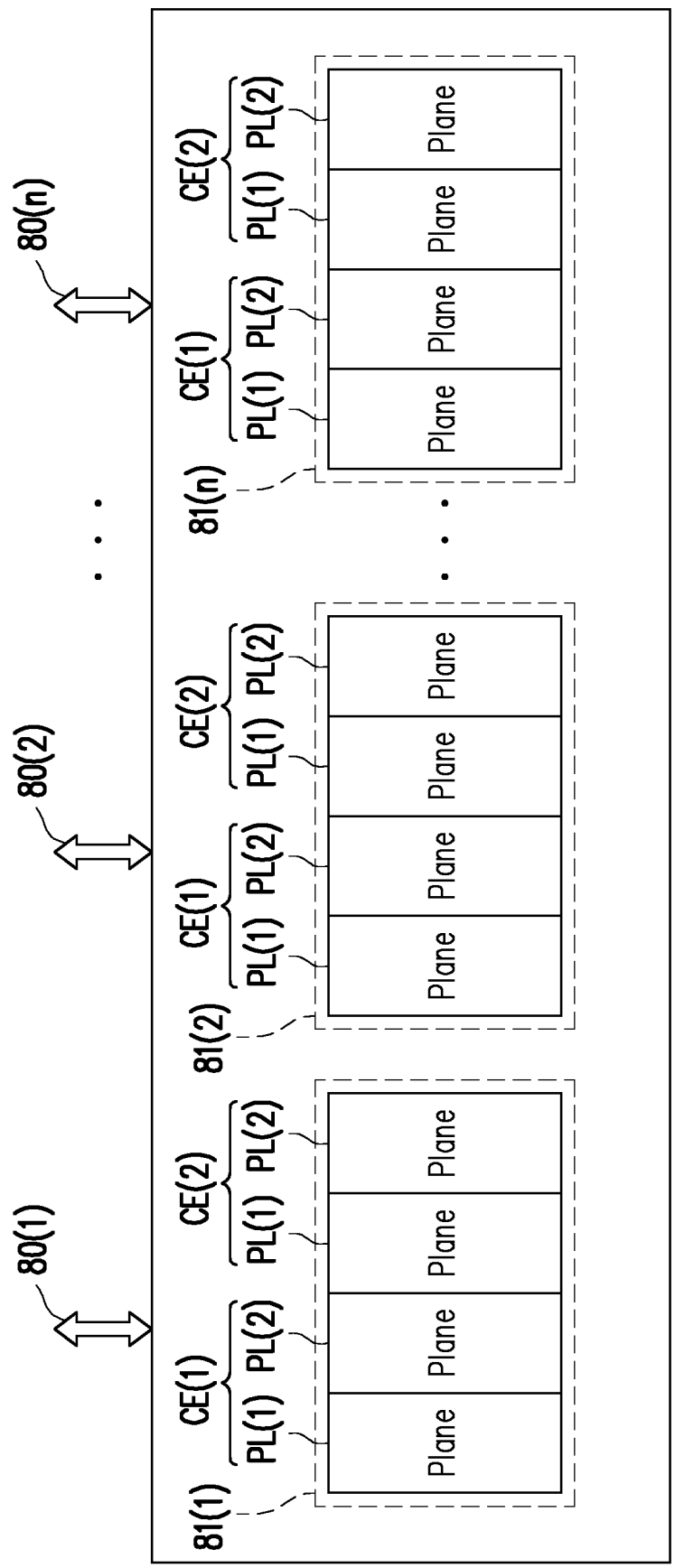
FIG. 8B is a schematic diagram illustrating management of a rewritable non-volatile memory module according to an exemplary embodiment of the disclosure.

FIG. 8B is a schematic diagram illustrating management of a RNVM module according to an exemplary embodiment of the disclosure. With reference to FIG. 8B, as compared to the exemplary embodiment of FIG. 8A, in this exemplary embodiment, each CEG CE(1) is further divided into two planes PL(1) and PL(2), and each CEG CE(2) is also further divided into two planes PL(1) and PL(2) The planes PL(1) and PL(2) also include a plurality of PAs. The MMC 502 can access the MUs 81(1) to 81(n) through channels 80(1) to 80(m). For example, the MMC 502 can access four planes in the MU 81(1) in parallel (or interleave) through four channels of the channels 80(1) to 80(m).

Figure 9:
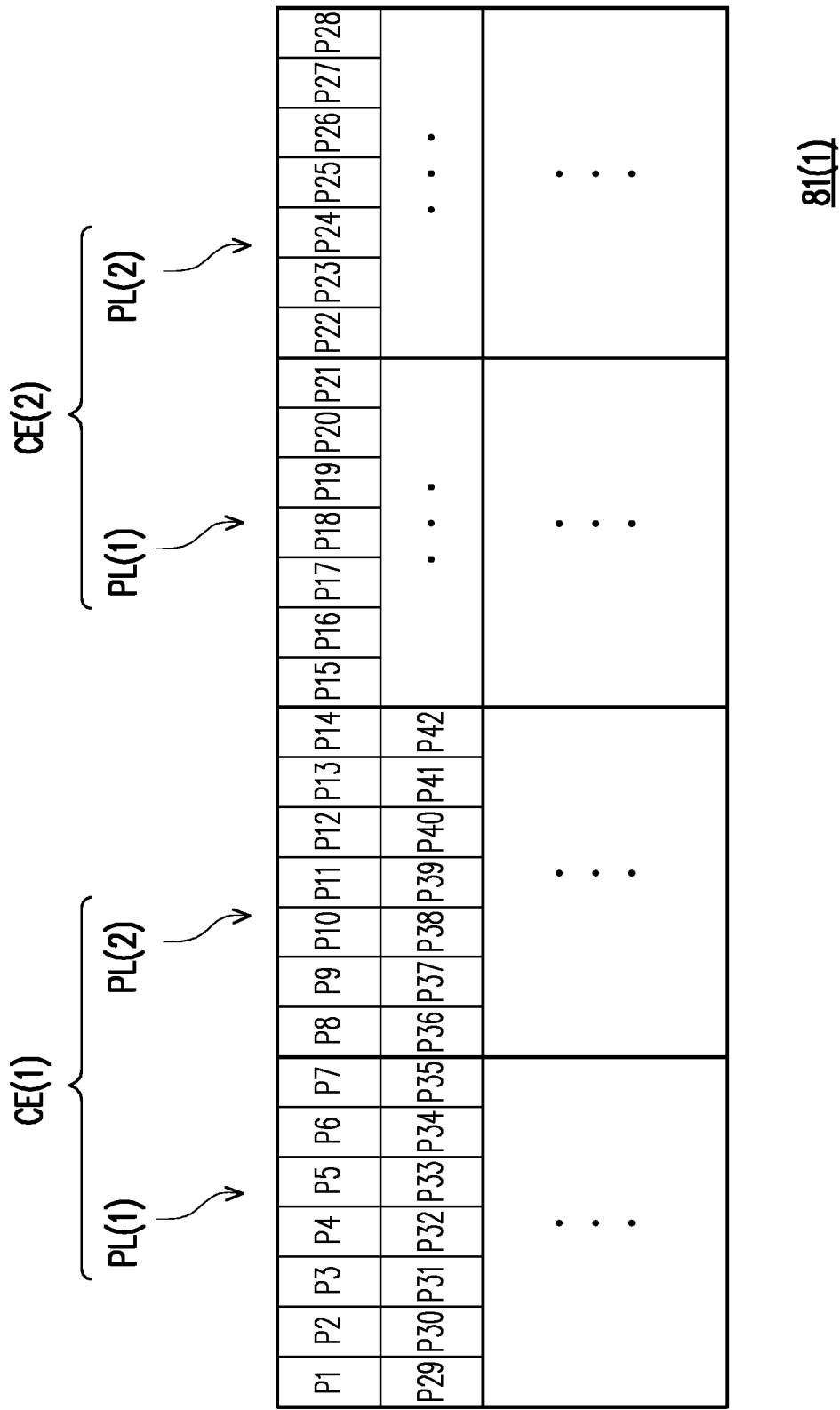
FIG. 9 is a schematic diagram illustrating a management unit according to an exemplary embodiment of the disclosure.

FIG. 9 is a schematic diagram illustrating a MU according to an exemplary embodiment of the disclosure. With reference to FIG. 9 in which the MU 81(1) is used as an example, the plane PL(1) in the CEG CE(1) may include PAs P1 to P7, P29 to P35, etc.; the plane PL(2) in the CEG CE(1) may include PAs P8 to P14, P36 to P42, etc.; the plane PL(1) in the chip group CE(2) may include PAs P15 to P21, etc.; and the plane PL(2) in the CEG CE(2) may include PAs P22 to P28, etc. The PAs P1 to P28 may be accessed in parallel (or interleaved) to improve the access efficiency.

In an exemplary embodiment, an operation of reading a plurality of PAs in one plane (e.g., the PAs P1 to P7) in parallel is also known a plane page reading; an operation of reading a plurality of PAs in multiple planes in one CEG (e.g., the PAs P1 to P14) in parallel is also known a multiple planes reading; and an operation of reading a plurality of PAs in multiple planes in multiple CEGs (e.g., the PAs P1 to P28) in parallel is also known a super page reading.

In an exemplary embodiment, if K continuous PAs in one specific CEG are all stored with the valid data, the K continuous PAs may be regarded as one CDU. For example, if K is 7 and the PAs P1 to P7 are all stored with the valid data, the PAs P1 to P7 may be regarded as one CDU. Alternatively, if K is 7 and the PAs P1 to P7 and P15 to P21 are all stored with the valid data, the PAs P1 to P7 may be regarded as one CDU and the PAs P15 to P21 may be regarded as another CDU. For example, if K is 7 and the PAs P1 to P28 are all stored with the valid data, the PAs P1 to P7, P8 to P14, P15 to P21 and P22 to P28 may respectively be regarded as one CDU. In the DMO, if one MU is selected as the source block, the valid data stored by at least one CDU in that MU may be read in parallel and stored into the recycling block.

It should be noted that, if any PA in the K continuous PAs is not stored with the valid data, the K continuous PAs will not be regarded as the CDU. For example, if K is 7 and the PAs P1 to P5 and P7 are stored with the valid data but the PA P6 is not stored with the valid data (i.e., the data stored by the PA P6 is the invalid data), the PAs P1 to P7 are not regarded as one CDU. In an exemplary embodiment, it is assumed that the PAs P1 to P7 were originally one CDU, but the data stored by the PA P6 becomes the invalid data after new data from the host system 11 is written into one MU. In response to the data stored by the PA P6 becoming the invalid data, a total number of the CDUs in the MU 81(1) may be reduced by one.

It should be noted that, in the foregoing exemplary embodiment, one enabling group including two planes and one plane including seven PAs are used as an example. However, in another exemplary embodiment, one CEG may also include more or less planes and/or one plane may include more or less PAs. The disclosure is not limited in this regard. Further, in an exemplary embodiment, K may also be other values (e.g., 4 or 12), which are not particularly limited by the disclosure.

In an exemplary embodiment, after starting the DMO, the MMC 502 can read interleaving information of the MUs from the RNVM module 406. For example, the interleaving information may be stored in the system area 603 of FIG. 6. For example, the MMC 502 can read the interleaving information (a.k.a. first interleaving information) corresponding to the MU 81(1) (a.k.a. a first MU) and the interleaving information (a.k.a. second interleaving information) corresponding to the MU 81(2) (a.k.a. a second MU). The first interleaving information can reflect the total number of the CDUs (a.k.a. first CDUs) in the MU 81(1). The second interleaving information can reflect a total number of the CDUs (a.k.a. second CDUs) in the MU 81(2). With FIG. 9 as an example, if K is 7 and the PAs P1 to P42 in the MU 81(1) are all stored with the valid data, the first interleaving information can reflect that the total number of the first CDUs in the MU 81(1) is at least 6. Alternatively, if K is 7 and the PAs P22 to P28 and P29 to P35 in the MU 81(1) are all stored with the valid data, the first interleaving information can reflect that the total number of the first CDUs in the MU 81(1) is at least 2. The total number of the first CDUs in the MU 81(1) may be identical to or different from the total number of the second CDUs in the MU 81(2).

In an exemplary embodiment, a value of the first interleaving information is positively correlated to the total number of the first CDUs in the MU 81(1) and a value of the second interleaving information is positively correlated to the total number of the second CDUs in the MU 81(2). Therefore, if the total number of the first CDUs in the MU 81(1) is greater than the total number of the second CDUs in the MU 81(2), the value of the first interleaving information may be greater than the value of the second interleaving information. In the DMO, the MMC 502 can automatically determine the MU 81(1) as the source block and read the valid data from the first CDUs in the MU 81(1) according to the first interleaving information and the second interleaving information. The read valid data may be stored into the recycling block. After all the valid data in the MU 81(1) are all stored into the recycling block, the MU 81(1) may be erased to become the new spare block.

In an exemplary embodiment, the MMC 502 can automatically determine the MU 81(1) as the source block according to a numerical relationship between the first interleaving information and the second interleaving information (e.g., the value of the first interleaving information is greater than the value of the second interleaving information). For example, if the total number of the first CDUs in the MU 81(1) is greater than the total number of the second CDUs in the MU 81(2), the MMC 502 can preferentially select the MU 81(1) as the recycling block. After storing all the valid data in the MU 81(1) into the recycling block, the MMC 502 may continue to select the MU 81(2) as the recycling block.

In an exemplary embodiment, the MMC 502 may receive a write command from the host system. The MMC 502 can write data (a.k.a. first data) into one MU (a.k.a. a third MU) in the spare area 602 of FIG. 6 according to the write command. Then, in response to the first data being written into the third MU, the MMC 502 can update interleaving information (a.k.a. third interleaving information) corresponding to the third MU. The third interleaving information reflects a total number of the CDUs (a.k.a. third CDUs) in the third MU.

Similarly, with the MU 81(1) of FIG. 9 as an example, if the first data is stored into the continuous PAs P8 to P14, the PAs P8 to P14 may become one new CDU. In response to the first data being stored into the PAs P8 to P14, the MMC 502 may update the interleaving information to reflect that the total number of the CDUs in the MU 81(1) is increased by one. For example, if the third interleaving information originally reflects that the total number of the CDUs in the MU 81(1) is 2000, the updated third interleaving information can reflect that the total number of the CDUs in the MU 81(1) is 2001 (2000+1=2001).

In an exemplary embodiment, in response to the first data (i.e., the valid data) being stored into the K continuous PAs, the MMC 502 can store one identification bit (e.g., a bit "1") into one specific PA in the K PAs. The identification bit may be used to mark the K continuous PAs as one CDU. With the PAs P1 to P7 as an example, the MMC 502 can store one identification bit into the PA P1 (i.e., a first PA in the K continuous PAs), so as to reflect that all the PAs P1 to P7 are currently stored with the valid data and the PAs P1 to P7 belong to the same CDU. Similarly, the MMC 502 can store one identification bit into the PA P8, so as to reflect that all the PAs P8 to P14 are currently stored with the valid data and the PAs P8 to P14 belong to the same CDU. With FIG. 9 as an example, in an exemplary embodiment, the MMC 502 can determine whether the PAs P1 to P7, P8 to P14, P15 to P21, P29 to P35 and P36 to P42 are the CDUs respectively according to the PAs P1, P8, P15, P29 and P36. In addition, the MMC 502 can obtain the total number of the CDUs in the MU 81(1) according to a total number of the identification bits in the MU 81(1).

In an exemplary embodiment, in response to at least part of the first data stored in the continuous PAs being updated as invalid data, the MMC 502 can remove the identification bit and update the third interleaving information to reflect a reduction of the total number of the third CDUs. For example, it is assumed that the first data is stored in the continuous PAs P1 to P7 and the identification bit is stored into the PA P1. In response to the data stored by at least one PA in the PAs P1 to P7 being updated as the invalid data, the identification bit stored by the PA P1 may be removed (e.g., by adjusting the bit "1" into a bit "0") and the third interleaving information may be updated to reflect that the total number of the CDUs in the MU 81(1) is reduced by one. For example, if the third interleaving information originally reflects that the total number of the CDUs in the MU 81(1) is 2001, the updated third interleaving information can reflect that the total number of the CDUs in the MU 81(1) is 2000 (2001−1=2000).

In an exemplary embodiment, the MMC 502 can select at least one MU from the storage area 601 of FIG. 6 as a candidate MU of the recycling block according to a preset rule. For example, after starting the DMO, the MMC 502 can read valid count information corresponding to at least part of the MUs in the storage area 601 from the system area 603 of FIG. 6. The valid count information reflects a data quantity of the valid data stored by the corresponding MU. The MMC 502 can select at least part of the MUs from the MUs as the candidate MU according to the valid count information. For example, the MMC 502 can select at least one MU stored with the least valid data as the candidate MU according to the valid count information. Alternatively, the MMC 502 can select at least one MU with the data quantity that falls within a preset range as the candidate MU according to the valid count information. In addition, the preset rule may further include selecting the candidate MU according to a cold/hot degree of the data stored by at least one MU or the like, which is not particularly limited by the disclosure.

In an exemplary embodiment, if a total number of the candidate MUs is 1, the MMC 502 can directly set the candidate MU as the recycling block. Alternatively, in an exemplary embodiment, if the total number of the candidate MUs is greater than 1, the MMC 502 can preferentially select one of the candidate MUs as the recycling block according to the interleaving information corresponding to the candidate MUs. It should be noted that, in an exemplary embodiment, the MMC 502 may also skip selecting the candidate MU and directly select one specific MU as the recycling block according to the interleaving information. The disclosure is not limited in this regard.

FIG. 10 is a schematic diagram illustrating interleaving information according to an exemplary embodiment of the disclosure. FIG. 11 is a schematic diagram illustrating valid count information according to an exemplary embodiment of the disclosure. With reference to FIG. 10 and FIG. 11, in an exemplary embodiment, the MMC 502 can read interleaving information 41) to I(n) corresponding to the MUs 81(1) to 81(n) from an interleaving information table 1000. For example, the interleaving information I(i) reflects the total number of the CDUs in the MU 81(i), and i is between 1 and n. The MMC 502 can also read valid count information C(1) to C(n) corresponding to the MUs 81(1) to 81(n) from a valid count information table 1100. The valid count information C(i) reflects the data quantity of the valid data stored by the MU 81(i). The interleaving information table 1000 and the valid count information table 1100 may be stored in the system area 603 of FIG. 6.

In an exemplary embodiment, the MMC 502 can select at least one MU from the MUs 81(1) to 81(n) as the candidate MU according to the information recorded in one of the interleaving information table 1000 and the valid count information table 1100. Then, the MMC 502 can select at least one MU from the determined candidate MUs as the recycling block according to another one of the interleaving information table 1000 and the valid count information table 1100. For example, if the MMC 502 selects the MUs 81(1) and 81(2) as the candidate MUs of the recycling block according to the valid count information C(1) to C(n), the MMC 502 can further select one of the MUs 81(1) and 81(2) as the recycling block according to the numerical relationship between the interleaving information 41) and I(2). For example, if the value of the interleaving information 41) is greater than the value of the interleaving information I(2), the MMC 502 can preferentially select the MU 81(1) as the recycling block. Further, in an exemplary embodiment, the MMC 502 can also directly select at least one MU from the MUs 81(1) to 81(n) as the recycling block according to the information recorded by at least one of the interleaving information table 1000 and the valid count information table 1100. Alternatively, the MMC 502 can also select at least one MU from the MUs 81(1) to 81(n) as the candidate MU first according to the interleaving information table 1000, and then select one from the candidate MUs as the recycling block according to the valid count information table 1100.

In an exemplary embodiment, the MMC 502 can preferentially select the MU with the value of the interleaving information being greater and/or the value of the valid count information being smaller as the recycling block according to the interleaving information table 1000 and the valid count information table 1100. In an exemplary embodiment, the MMC 502 can also substitute the interleaving information 41) to I(n) and the valid count information C(1) to C(n) into an algorithm to obtain a plurality of estimated values corresponding to the MUs 81(1) to 81(n). The MMC 502 can preferentially select one of the MUs 81(1) to 81(n) as the recycling block according to the estimated values.

Figure 12:
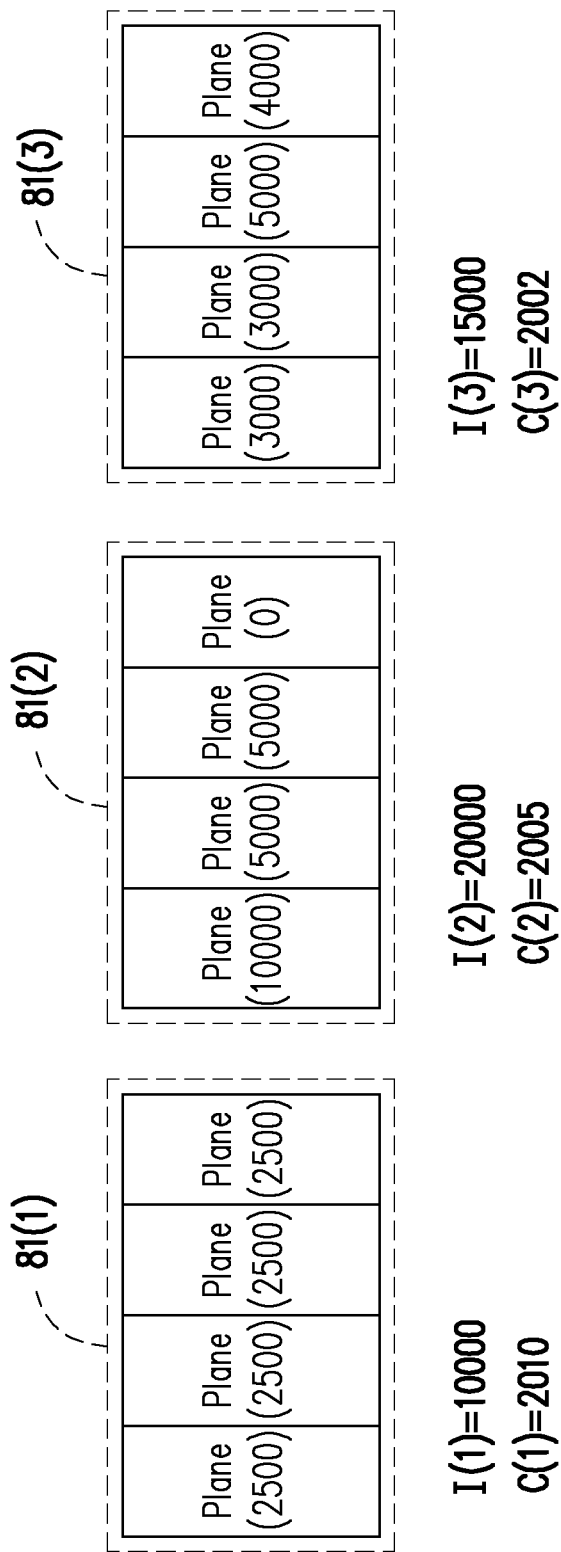
FIG. 12 is a schematic diagram illustrating how a recycling block is selected according to an exemplary embodiment of the disclosure.

FIG. 12 is a schematic diagram illustrating how a recycling block is selected according to an exemplary embodiment of the disclosure. With reference to FIG. 12, in this exemplary embodiment, the interleaving information 41) is 10000 which reflects that the MU 81(1) includes 10000 CDUs, and the valid count information C(1) is 2010 which reflects that the MU 81(1) is stored with the valid data of 2010 physical pages. The interleaving information I(2) is 20000 which reflects that the MU 81(2) includes 20000 CDUs, and the valid count information C(2) is 2005 which reflects that the MU 81(2) is stored with the valid data of 2005 physical pages. The interleaving information I(3) is 15000 which reflects that the MU 81(3) includes 15000 CDUs, and the valid count information C(3) is 2002 which reflects that the MU 81(3) is stored with the valid data of 2002 physical pages.

In this exemplary embodiment, the MMC 502 can select the MUs 81(1) to 81(3) as the candidate MUs according to the valid count information C(1) to C(3) all being less than 2500. Next, the MMC 502 can compare the interleaving information 41) to I(3). In response to the interleaving information C(2) being greater than the interleaving information 41) and I(3), the MMC 502 can preferentially select the MU 81(2) as the recycling block.

In an exemplary embodiment, the MMC 502 can evaluate a degree of dispersion of the CDUs in the physical units. The degree of dispersion may be expressed by dispersion information. For example, one physical unit can correspond to one CEG or one plane. The MMC 502 can preferentially determine one specific MU as the recycling block according to the degree of dispersion (or the dispersion information).

With FIG. 12 as an example, if one physical unit refers to one plane, the interleaving information I(1) to I(3) corresponding to the MUs 81(1) to 81(3) may be counted separately in units of planes. For example, in the MU 81(1), four planes respectively include 2500, 2500, 2500 and 2500 CDUs (in the total of 10000=41)). In the MU 81(2), four planes respectively include 10000, 5000, 5000 and 0 CDUs (in the total of 20000=I(2)). In the MU 81(3), four planes respectively include 3000, 3000, 5000 and 4000 CDUs (in the total of 15000=I(3)). The MMC 502 can further select one from the MUs 81(1) to 81(3) as the recycling block according to the degree of dispersion of the CDUs in the planes.

In an exemplary embodiment, the MMC 502 can obtain the degree of dispersion of the CDUs in the planes according to the number of the CDUs in each plane (i.e., physical unit) of the same MU. With FIG. 12 as an example, since each plane in the MU 81(1) includes the same number of the CDUs (i.e., 2500), the MMC 502 can determine that the degree of dispersion of the CDUs in each plane of the MU 81(1) is the highest (i.e., the CDUs are most evenly distributed across the planes). Similarly, since the numbers of CDUs included by the planes of the MU 81(2) differ the most, the MMC 502 can determine that the degree of dispersion of the CDUs in each plane of the MU 81(2) is the lowest (i.e., the CDUs are centralized in a few planes). Therefore, in an exemplary embodiment, the MMC 502 can preferentially select the MU 81(1) as the recycling block.

In an exemplary embodiment, the MMC 502 can select the source block from the MUs according to at least two types of information including the valid count information, the interleaving information and the dispersion information. With FIG. 12 as an example, the MMC 502 can select one of the MUs 81(1) to 81(3) as the recycling block by comprehensively taking all of the interleaving information 41) to I(3), the valid count information C(1) to C(3) and the degree of dispersion of the CDUs in the physical units (i.e., the dispersion information) into consideration. For example, the MMC 502 can substitute the interleaving information 41) to I(3), the valid count information C(1) to C(3) and the dispersion information into an algorithm and select one of the MUs 81(1) to 81(3) as the recycling block according to an output of the algorithm.

Based on the foregoing exemplary embodiments, in most cases, the MU preferentially selected as the recycling block may have the characteristics of less valid data, more CDUs and/or higher degree of dispersion of the CDUs in the planes (i.e., the physical units) to improve overall execution efficiency of the DMO. For example, less valid data can reduce the data quantity of the valid that needs to be moved; more CDUs can accelerate a data reading speed; and higher degree of dispersion can increase the probability of reading the valid data from the planes in parallel.

Figure 13:
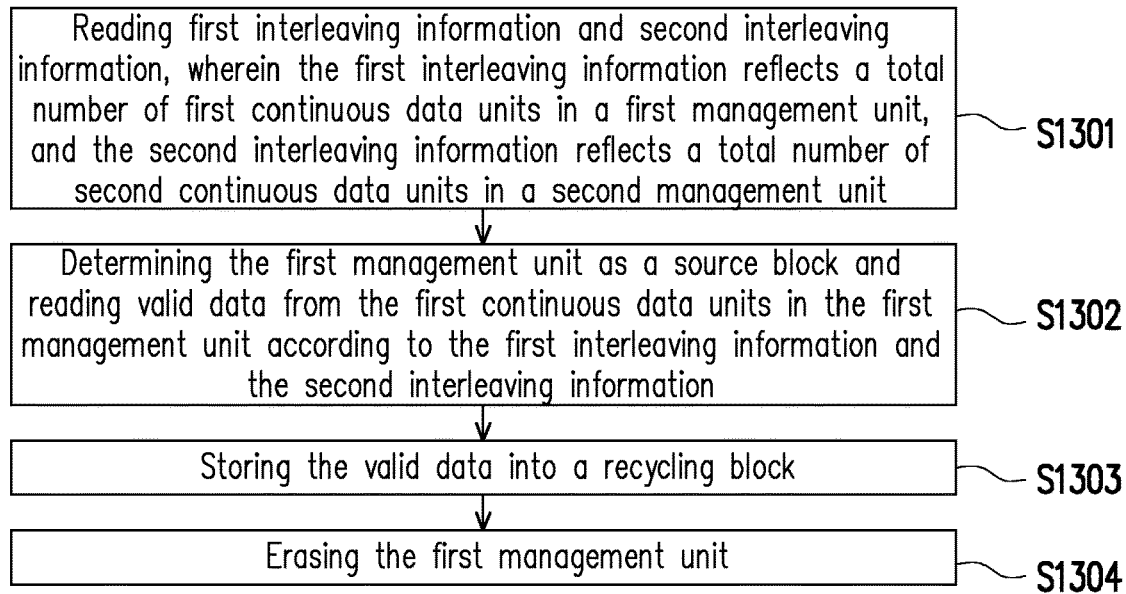
FIG. 13 is a flowchart illustrating a memory control method according to an exemplary embodiment of the disclosure.

FIG. 13 is a flowchart illustrating a memory control method according to an exemplary embodiment of the disclosure. With reference to FIG. 13, in step S1301, first interleaving information and second interleaving information are read. The first interleaving information reflects a total number of the first CDUs in the first MU. The second interleaving information reflects a total number of second CDUs in the second MU. In step S1302, a first MU is determined as a source block and valid data is read from a first CDU in the first MU according to the first interleaving information and the second interleaving information. In step S1303, the read valid data is stored into a recycling block. In step S1304, the first MU is erased.

Figure 14:
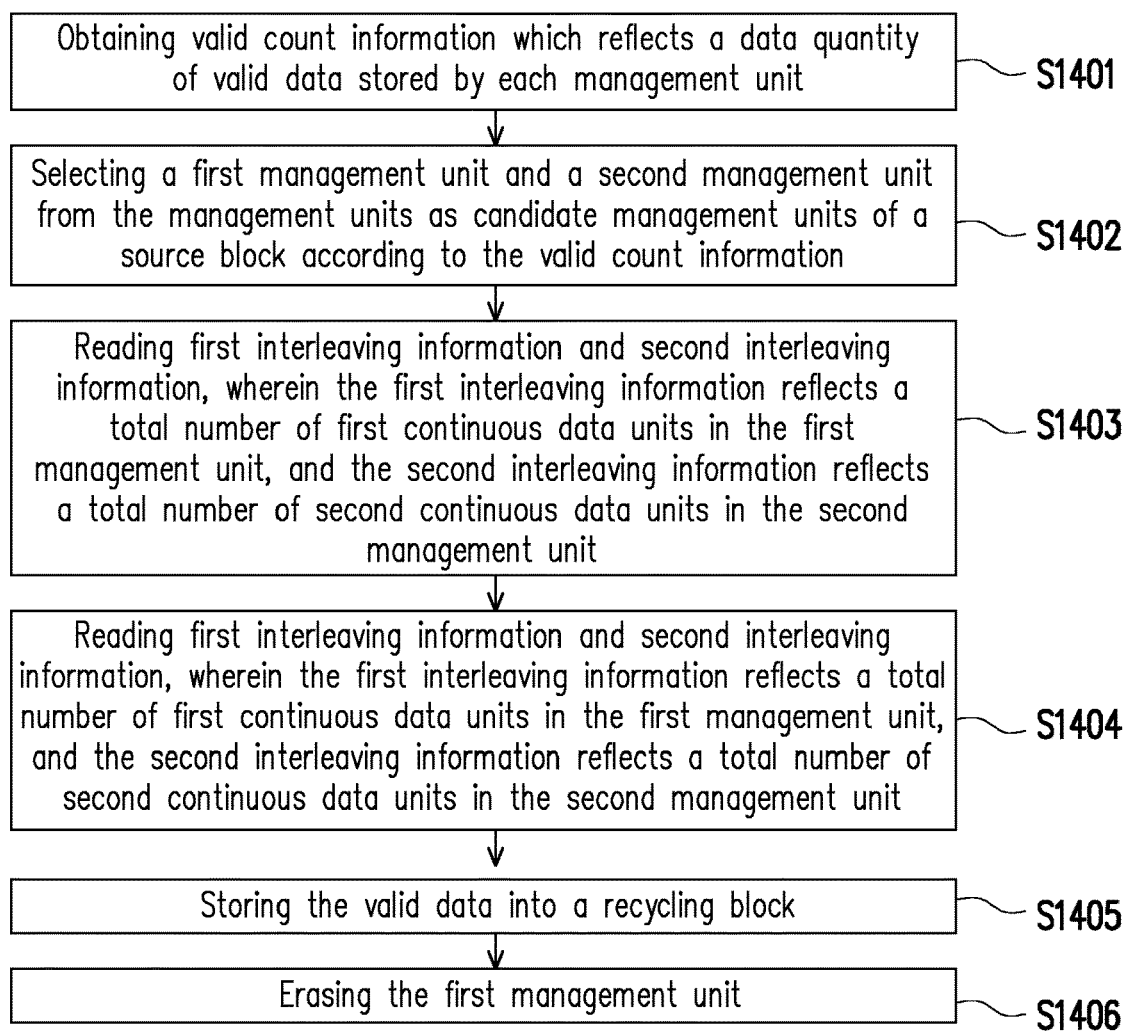
FIG. 14 is a flowchart illustrating a memory control method according to an exemplary embodiment of the disclosure.

FIG. 14 is a flowchart illustrating a memory control method according to an exemplary embodiment of the disclosure. With reference to FIG. 14, in step S1401, valid count information is read. The valid count information reflects a data quantity of the valid data stored by each MU. In step S1402, the first MU and the second MU are selected from the MUs as a candidate MU of a source block according to the valid count information. In step S1403, first interleaving information and second interleaving information are read. The first interleaving information reflects a total number of the first CDUs in the first MU. The second interleaving information reflects a total number of second CDUs in the second MU. In step S1404, the first MU is determined as the source block and the valid data is read from a first CDU in the first MU according to the first interleaving information and the second interleaving information. In step S1405, the read valid data is stored into a recycling block. In step S1406, the first MU is erased.

Figure 15:
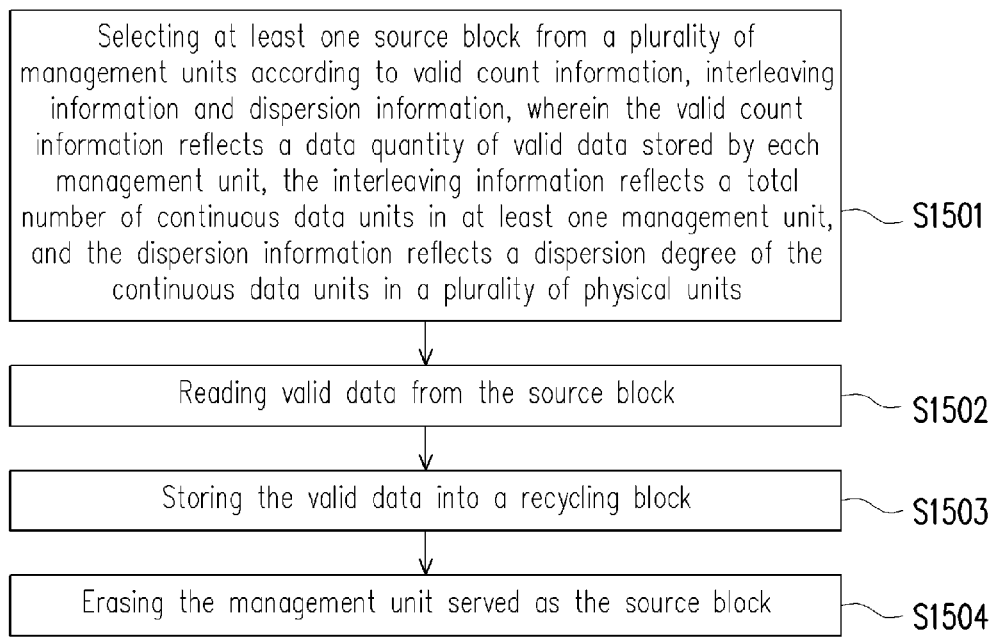
FIG. 15 is a flowchart illustrating a memory control method according to an exemplary embodiment of the disclosure.

FIG. 15 is a flowchart illustrating a memory control method according to an exemplary embodiment of the disclosure. With reference to FIG. 15, in step S1501, at least one source block is selected from a plurality of MUs according to valid count information, interleaving information and dispersion information. The valid count information reflects a data quantity of the valid data stored by each MU. The interleaving information reflects a total number of CDUs included by at least one MU. The dispersion information reflects a degree of dispersion of the CDUs in a plurality of physical units. In step S1502, the valid data is read from the source block. In step S1503, the read valid data is stored into a recycling block. In step S1504, the MU served as the source block is erased.

Nevertheless, each of steps depicted in FIG. 13 to FIG. 15 have been described in detail as above, and thus related description is not repeated hereinafter. It should be noted that, the steps depicted in FIG. 13 to FIG. 15 may be implemented as a plurality of program codes or circuits, which are not particularly limited in the disclosure. Moreover, the methods disclosed in FIG. 13 and FIG. 15 may be implemented with reference to above embodiments, or may be implemented separately, which are not particularly limited in the disclosure.

In summary, during the process of selecting the recycling block, the exemplary embodiments of the disclosure can preferentially select the most suitable MU as the recycling block by taking the data quantity of the valid data stored in the MU, the number of the CDUs and/or the degree of dispersion of the CDUs into consideration, so as to improve overall execution efficiency of the DMO. On the premise that overall execution efficiency of the DMO can be improved, the system performance of the memory storage device may also be improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory control method for a rewritable non-volatile memory module, wherein the rewritable non-volatile memory module comprises a plurality of management units, the management units comprise a first management unit and a second management unit, and the memory control method comprises:
   determining the first management unit as a source block and reading valid data from a first continuous data unit in the first management unit according to first interleaving information and second interleaving information, wherein the first interleaving information reflects a total number of the first continuous data units in the first management unit, and the second interleaving information reflects a total number of second continuous data units in the second management unit;
   storing the valid data into a recycling block in the management units;
   erasing the first management unit;
   receiving a write command from a host system; and
   writing first data into a third management unit in the management units according to the write command, wherein the step of writing the first data into the third management unit in the management units according to the write command comprises:
      writing the first data into a plurality of continuous physical addresses in the third management unit; and
      storing an identification bit into a first physical address in the continuous physical addresses, wherein the identification bit reflects that the continuous physical addresses belong to the third continuous data unit.

2. The memory control method according to claim 1, wherein the first management unit comprises a plurality of physical units, and the step of determining the first management unit as the source block according to the first interleaving information and the second interleaving information comprises:
   determining a degree of dispersion of the first continuous data units in the physical units; and
   determining the first management unit as the source block according to the degree of dispersion.

3. The memory control method according to claim 2, wherein each of the physical units corresponds to one memory plane or one chip enable group.

4. The memory control method of claim 1, further comprising:
   obtaining valid count information, which reflects a data quantity of the valid data stored by each of the management units; and
   selecting the first management unit and the second management unit from the management units as a candidate management unit of the source block according to the valid count information.

5. The memory control method of claim 1, further comprising:
   in response to the first data being written into the third management unit, updating third interleaving information, which reflects a total number of third continuous data units in the third management unit.

6. The memory control method of claim 5, further comprising:
   in response to at least part of the first data stored in the continuous physical addresses being updated as invalid data, removing the identification bit and updating the third interleaving information to reflect a reduction of the total number of the third continuous data units.

7. A memory storage device, comprising:
   a connection interface unit, configured to couple to a host system;
   a rewritable non-volatile memory module, wherein the rewritable non-volatile memory module comprises a plurality of management units, and the management units comprise a first management unit and a second management unit; and
   a memory control circuit unit, coupled to the connection interface unit and the rewritable non-volatile memory module,
   wherein the memory control circuit unit is configured to determine the first management unit as a source block and send at least one read command sequence as an instruction for reading valid data from a first continuous data unit in the first management unit according to first interleaving information and second interleaving information, the first interleaving information reflects a total number of the first continuous data units in the first management unit, and the second interleaving information reflects a total number of second continuous data units in the second management unit,
   the memory control circuit unit is further configured to send at least one first write command sequence as an instruction for storing the valid data into a recycling block in the management units,
   the memory control circuit unit is further configured to send an erase command sequence as an instruction for erasing the first management unit,
   the memory control circuit unit is further configured to receive a write command from the host system, and
   the memory control circuit unit is further configured to send at least one second write command sequence according to the write command as an instruction for writing first data into a third management unit in the management units, wherein the operation in which the memory control circuit unit sends the at least one second write command sequence according to the write command as the instruction for writing the first data into the third management unit in the management units comprises:
      an instruction for writing the first data into a plurality of continuous physical addresses in the third management unit; and
      an instruction for storing an identification bit into a first physical address in the continuous physical addresses, wherein the identification bit reflects that the continuous physical addresses belong to the third continuous data unit.

8. The memory storage device according to claim 7, wherein the first management unit comprises a plurality of physical units, and the operation in which the memory control circuit unit determines the first management unit as the source block according to the first interleaving information and the second interleaving information comprises:
   determining a degree of dispersion of the first continuous data units in the physical units; and
   determining the first management unit as the source block according to the degree of dispersion.

9. The memory storage device according to claim 8, wherein each of the physical units corresponds to one memory plane or one chip enable group.

10. The memory storage device according to claim 7, wherein the memory control circuit unit is further configured to obtain valid count information, which reflects a data quantity of the valid data stored by each of the management units, and the memory control circuit unit is further configured to select the first management unit and the second management unit from the management units as a candidate management unit of the source block according to the valid count information.

11. The memory storage device according to claim 7, wherein in response to the first data being written into the third management unit, the memory control circuit unit is further configured to update third interleaving information, which reflects a total number of third continuous data units in the third management unit.

12. The memory storage device according to claim 11, wherein in response to at least part of the first data stored in the continuous physical addresses being updated as invalid data, the memory control circuit unit is further configured to remove the identification bit and update the third interleaving information to reflect a reduction of the total number of the third continuous data units.

13. A memory control circuit unit for controlling a rewritable non-volatile memory module, wherein the rewritable non-volatile memory module comprises a plurality of management units, the management units comprise a first management unit and a second management unit, and the memory control circuit unit comprises:

a host interface, configured to couple to a host system, a memory interface, configured to couple to the rewritable non-volatile memory module; and a memory management circuit, coupled to the host interface and the memory interface;

wherein the memory management circuit is further configured to determine the first management unit as a source block and send at least one read command sequence as an instruction for reading valid data from a first continuous data unit in the first management unit according to first interleaving information and second interleaving information, the first interleaving information reflects a total number of the first continuous data units in the first management unit, and the second interleaving information reflects a total number of second continuous data units in the second management unit, the memory management circuit is further configured to send at least one first write command sequence as an instruction for storing the valid data into a recycling block in the management units, the memory management circuit is further configured to send an erase command sequence as an instruction for erasing the first management unit, the memory management circuit is further configured to receive a write command from the host system, and the memory management circuit is further configured to send at least one second write command sequence according to the write command as an instruction for writing first data into a third management unit in the management units, wherein the operation in which the memory management circuit sends the at least one second write command sequence according to the write command as the instruction for writing the first data into the third management unit in the management units comprises:

an instruction for writing the first data into a plurality of continuous physical addresses in the third management unit; and an instruction for storing an identification bit into a first physical address in the continuous physical addresses, wherein the identification bit reflects that the continuous physical addresses belong to the third continuous data unit.

14. The memory control circuit unit according to claim 13, wherein the first management unit comprises a plurality of physical units, and the operation in which the memory management circuit determines the first management unit as the source block according to the first interleaving information and the second interleaving information comprises:

determining a degree of dispersion of the first continuous data units in the physical units; and determining the first management unit as the source block according to the degree of dispersion.

15. The memory control circuit unit according to claim 14, wherein each of the physical units corresponds to one memory plane or one chip enable group.

16. The memory control circuit unit according to claim 13, wherein the memory management circuit is further configured to obtain valid count information, which reflects a data quantity of the valid data stored by each of the management units, and the memory management circuit is further configured to select the first management unit and the second management unit from the management units as a candidate management unit of the source block according to the valid count information.

17. The memory control circuit unit according to claim 13, wherein in response to the first data being written into the third management unit, the memory management circuit is further configured to update third interleaving information, which reflects a total number of third continuous data units in the third management unit.

18. The memory control circuit unit according to claim 17, wherein in response to at least part of the first data stored in the continuous physical addresses being updated as invalid data, the memory management circuit is further configured to remove the identification bit and update the third interleaving information to reflect a reduction of the total number of the third continuous data units.

* * * * *